Aug. 10, 1948.     J. H. ENGLAND     2,446,533
CONTROL CIRCUIT FOR GAS DISCHARGE TUBES
Filed April 4, 1946
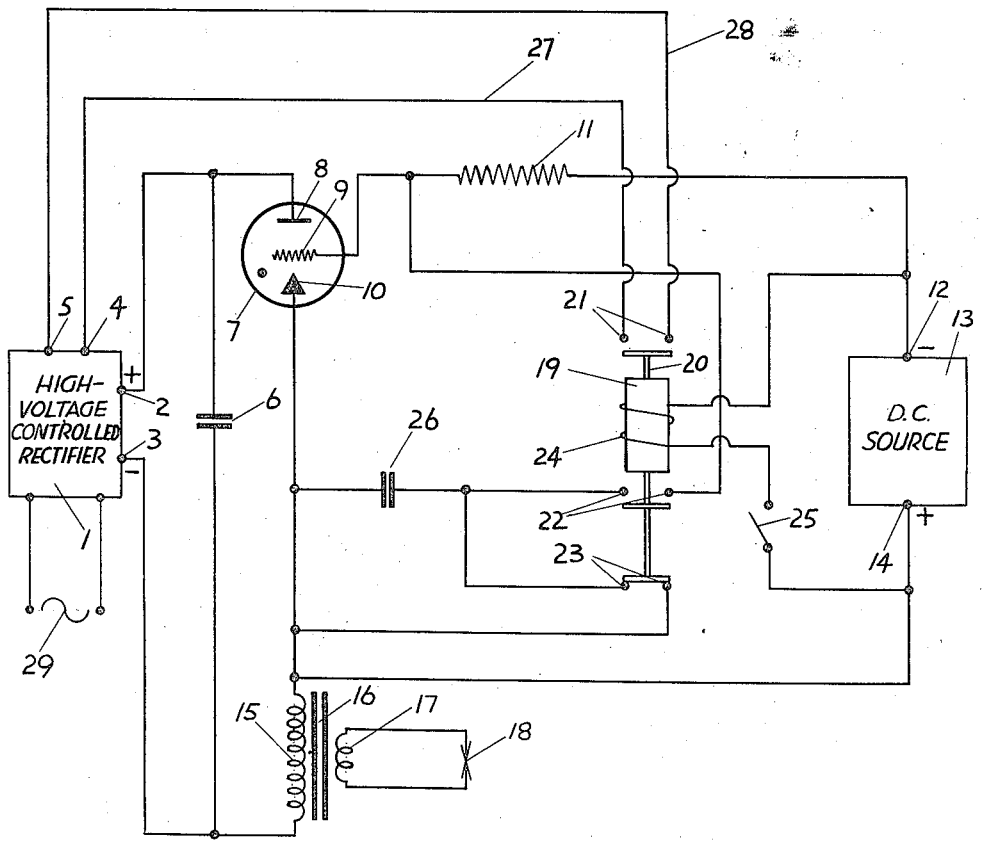
INVENTOR
JOHN H. ENGLAND
BY Elmer J. Gorn
ATTY.

UNITED STATES PATENT OFFICE 2,446,533

CONTROL CIRCUIT FOR GAS DISCHARGE TUBES

John H. England, Wellesley Hills, Mass., assignor to Raytheon Manufacturing Company, Newton, Mass., a corporation of Delaware Application April 4, 1946, Serial No. 659,458

7 Claims. (Cl. 315—273)

This invention relates to electrical circuits, and more particularly to a discharge starting circuit for gas discharge tubes.

An object of this invention is to devise a control circuit for gas discharge tubes in which a sufficiently low negative potential is first applied to the control element of the tube to start the discharge, but in which the control element is thereafter returned rapidly and automatically to its original high negative potential.

A further object is to devise a discharge starting circuit for gas discharge tubes, operated by a relay, in which the discharge, once it is started in response to energization of the relay, will be put out and will not be restarted even though the relay be maintained energized.

The foregoing and other objects of the invention will be best understood from the following description of an exemplification thereof, reference being had to the accompanying drawing, wherein the single figure is a diagrammatic representation of one means for carrying out the invention.

In a certain type of welding equipment, a condenser, charged from a high-voltage rectifier source, is discharged through a gas discharge tube, for example a thyratron, in response to closure of a control switch by the operator, to supply welding current to a pair of electrodes. The closure of the switch so controls the rectifier source as to disconnect it from the condenser during the welding operation, but it is automatically reconnected to the condenser after a certain time has elapsed, in order to start charging the condenser for the next welding operation. It is essential that the recharging of the condenser begin as soon as possible after the welding operation has been completed, in order that it may be charged before the next welding cycle, which may follow the preceding one very closely in time, is begun. In the systems of the prior art, if the operator accidentally or improperly held the control switch closed for too long a period, the thyratron voltage remained such that the thyratron would be re-fired at the instant when the rectifier was reconnected to the condenser, and, instead of the source charging the condenser, said source would be short-circuited through the anode-cathode path of the thyratron. In the system of the present invention, the potential of the grid of the thyratron is first reduced to a relatively low value, with respect to its cathode, to fire the tube and discharge the condenser, in response to closure of the control switch by the operator. However, the grid potential is then rapidly and automatically returned to its high initial value, and this is accomplished even if the control switch remains closed. Because of the rapid recovery of the grid voltage to its initial (high negative) value, the thyratron will not be re-fired when the rectifier is re-connected to the condenser, even if the control switch remains closed, so that the source may recharge the condenser, as desired, for the next welding cycle.

Referring, now, to the drawing, a high-voltage controlled rectifier 1 supplied from a source of alternating current 29 has positive and negative output terminals 2 and 3, respectively, and control terminals 4 and 5. Rectifier 1 is so arranged that, when a circuit is closed between control terminals 4 and 5, said rectifier will be effectively disconnected or isolated from its output terminals 2 and 3 for a predetermined period, after which it will be automatically reconnected to said output terminals. Power condenser 6 is connected across output terminals 2 and 3, so as to be charged from said rectifier. A gaseous discharge device 7, for example a thyratron, has anode 8, grid or control element 9, and cathode 10. Anode 8 is connected to output terminal 2, while cathode 10 is connected through the primary 15 of a welding transformer 16 to output terminal 3, so that condenser 6 is connected across the anode-cathode path of discharge device 7 and primary 15 in series. Welding electrodes 18 are connected across the secondary 17 of transformer 16.

Grid 9 of tube 7 is connected, through a resistor 11, to the negative output terminal 12 of a direct current source 13, the positive output terminal 14 of which is connected to cathode 10. Source 13 may have an output voltage of 125 volts, for example, while resistor 11 may have a resistance of 100,000 ohms, for example. Relay 19 has an armature 20, a pair of normally-open contacts 21, a second pair of normally-open contacts 22, a pair of normally-closed contacts 23, and an operating winding 24. Winding 24 is connected, in series with a control switch 25, across the terminals 12 and 14 of source 13, so as to be energized from said source when switch 25 is closed. One of contacts 21 is connected, by means of lead 27, to control terminal 4 of rectifier 1, while the other of contacts 21 is connected, by means of lead 28, to control terminal 5 of said rectifier.

Condenser 26 has one terminal thereof connected to cathode 10, while its other terminal is connected, in series with relay contacts 22, to grid 9, between said grid and resistor 11. Contacts 23 of the relay are connected in shunt with condenser 26. Condenser 26 may have a capacitance of 0.005 microfarad, for example.

Originally, condenser 6 is charged, being charged from rectifier 1. Condenser 26 is originally discharged, as a result of normally-closed relay contacts 23 shunted thereacross. With the polarities shown, tube 7 is rendered non-conducting because its grid 9 is highly negative with respect to its cathode, having the high negative potential of source 13 applied thereto.

When control switch 25 is closed to start the operation, winding 24 of relay 19 is connected across source 13, so that relay 19 is energized to close contacts 21 and 22 and open contacts 23. Relay 19 remains energized as long as switch 25 is closed. Closure of contacts 22 connects condenser 26 in series with resistor 11 across source 13, while opening of contacts 23 opens the shunt circuit across said condenser. Condenser 26 starts to charge from source 13 through resistor 11. The initial inrush of current into the condenser is drawn through resistor 11, causing most of the bias voltage of source 13 to appear as a voltage drop across resistor 11, and the remainder, which is low enough to allow tube 7 to fire, to appear across the condenser 26, which is connected directly between cathode 10 and grid 9. Tube 7 therefore fires, allowing condenser 6 to discharge therethrough and through the primary 15 of the welding transformer. During this time interval, due to the closure of relay contacts 21 completing a circuit between control terminals 4 and 5 of controlled rectifier 1, said rectifier is disassociated from its output terminals 2 and 3. As condenser 6 discharges, the voltage between anode 8 and cathode 10 will be reduced, until a point is reached at which the said voltage is insufficient to maintain the arc in tube 7, so that the arc goes out. Rectifier 1 is still disassociated from its output terminals at this time. When rectifier 1 is reconnected to condenser 6 to recharge it, thus placing a positive potential on anode 8, the arc in tube 7 will not be re-established provided that a sufficiently negative potential exists on grid 9 at this time.

As condenser 26 becomes charged the voltage across resistor 11 decreases, due to decrease in the current flowing therethrough, and the voltage across the condenser increases, due to its becoming charged. When the condenser 26 has fully charged, the grid to cathode voltage of tube 7 has returned to its original high negative value. The time required to charge condenser 26 is dependent upon the capacitance of said condenser and the resistance of resistor 11, and is made less than the time elapsing between isolation of rectifier 1 from its output terminals and reconnection of said rectifier thereto. Due to the high negative potential on grid 9 at the instant when rectifier 1 is reconnected to output terminals 2—3, as a result of the charge on condenser 26, the arc in tube 7 will not be re-fired at said instant. Condenser 26 remains charged as long as contacts 23 remain open due to the energization of relay 19, thereby maintaining a high negative bias on grid 9 as long as relay 19 is energized. Therefore, tube 7 will not refire even though relay 19 is kept energized due to closure of switch 25 and even though the anode-cathode voltage of tube 7 has risen above the value necessary to maintain the arc, provided of course that the time constant of condenser 26 is such that it has fully charged before the anode-cathode voltage of tube 7 again rises above the value necessary to maintain the arc, as stated above. Of course, if relay 19 is deenergized, opening of contacts 22 entirely disconnects condenser 26 from the grid 9, so that the high negative bias provided by source 13 is maintained on said grid to prevent firing of the tube.

Opening of switch 25 deenergizes relay 19, opening contacts 21 and 22, and closing contacts 23. Closure of contacts 23 discharges condenser 26, while opening of contacts 22 disconnects said condenser from source 13. Opening of contacts 21 readies the control circuit of rectifier 1 for the next operation. Tube 7 can then be refired when relay 19 is re-energized for the next operation.

Of course, it is to be understood that this invention is not limited to the particular details as described above, as many equivalents will suggest themselves to those skilled in the art. It is accordingly desired that the appended claims be given a broad interpretation commensurate with the scope of this invention within the art.

What is claimed is:

1. A discharge-starting circuit for gaseous discharge devices, comprising a gaseous discharge device having at least anode, cathode, and control elements, a source of direct current, means connecting the negative side of said source through a resistor to said control element, means connecting the positive side of said source to said cathode, a condenser having one terminal connected to said cathode, a relay having a pair of normally-open contacts, and means connecting one of said contacts to said condenser and the other of said contacts to said control element.

2. A discharge-starting circuit for gaseous discharge devices, comprising a gaseous discharge device having at least anode, cathode, and control elements, a source of direct current, means connecting the negative side of said source through a resistor to said control element, means connecting the positive side of said source to said cathode, a condenser having one terminal connected to said cathode, a relay having a pair of normally-open contacts and a pair of normally-closed contacts, means connecting said normally-closed contacts across said condenser, and means connecting one of said normally-open contacts to said condenser and the other of said normally-open contacts to said control element.

3. A discharge-starting circuit for gaseous discharge devices, comprising a gaseous discharge device having at least anode, cathode, and grid elements, a source of direct current, means connecting the negative side of said source through a resistor to said grid, means connecting the positive side of said source to said cathode, a condenser having one terminal connected to said cathode, a relay having a control winding, a pair of normally-open contacts and a pair of normally-closed contacts, means connecting said normally-closed contacts across said condenser, means connecting one of said normally-open contacts to said condenser and the other of said normally-open contacts to said grid, and means for energizing said control winding to close said normally-open contacts and open said normally-closed contacts.

4. A discharge-starting circuit for gaseous discharge devices, comprising a gaseous discharge device having at least anode, cathode, and control elements, a source of direct current, means connecting the negative side of said source through an impedance to said control element, means connecting the positive side of said source to said cathode, a normally-discharged condenser having one terminal connected to said cathode, and means operable at will to intermittently connect the other terminal of said condenser to said control element and thereby also to said source, through said impedance, to charge said condenser therefrom.

5. A discharge-starting circuit for gaseous discharge devices, comprising a gaseous discharge device having at least anode, cathode, and control elements, a source of direct current, means connecting the negative side of said source through a resistor to said control element, means connecting the positive side of said source to said cathode, a normally-discharged condenser having one terminal connected to said cathode, and means operable at will to intermittently connect the other terminal of said condenser to said control element and thereby also to said source, through said resistor, to charge said condenser therefrom.

6. A discharge-starting circuit for gaseous discharge devices, comprising a gaseous discharge device having at least anode, cathode, and control elements, a source of direct current normally rendering said device non-conducting by biasing said control element negatively with respect to said cathode, a normally-discharged condenser having one terminal connected to said cathode, and means operable at will to intermittently connect the other terminal of said condenser to said control element and thereby also to said source, through a resistor, to charge said condenser, the flow of charging current through said resistor providing a voltage drop which reduces said negative bias sufficiently to allow said device to conduct.

7. A discharge-starting circuit for gaseous discharge devices, comprising a gaseous discharge device having at least anode, cathode, and control elements, a source of direct current normally rendering said device non-conducting by biasing said control element negatively with respect to said cathode, a normally-discharged condenser having one terminal connected to said cathode, and means operable at will to intermittently connect the other terminal of said condenser to said control element and thereby also to said source, through a resistor, to charge said condenser, the flow of charging current through said resistor providing a voltage drop which reduces said negative bias sufficiently to allow said device to conduct, said condenser thereafter becoming charged with a polarity such as to place a negative potential on said control element.

JOHN H. ENGLAND.

REFERENCES CITED

The following references are of record in the file of this patent:

UNITED STATES PATENTS

| Number | Name | Date |
| --- | --- | --- |
| 2,114,614 | Schlesinger | Apr. 18, 1938 |
| 2,169,023 | Dawson | Aug. 8, 1939 |
| 2,320,916 | Dawson | June 1, 1943 |
| 2,363,305 | Faulk | Nov. 21, 1944 |